(12) United States Patent
Groenewegen et al.

(10) Patent No.: US 11,775,293 B1
(45) Date of Patent: Oct. 3, 2023

(54) DEPLOYING A STATIC CODE ANALYZER BASED ON PROGRAM SYNTHESIS FROM INPUT-OUTPUT EXAMPLES

(71) Applicant: Microsoft Technology Licensing, LLC, Redmond, WA (US)

(72) Inventors: Peter Groenewegen, Sammamish, WA (US); Gustavo Araujo Soares, Seattle, WA (US); Arjun Radhakrishna, Seattle, WA (US); Mark Alistair Wilson-Thomas, Mercer Island, WA (US); Jonathan Keith Simmons, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/692,013

(22) Filed: Mar. 10, 2022

(51) Int. Cl.
G06F 8/75 (2018.01)
G06F 8/71 (2018.01)
G06F 8/33 (2018.01)

(52) U.S. Cl.
CPC ............... *G06F 8/75* (2013.01); *G06F 8/33* (2013.01); *G06F 8/71* (2013.01)

(58) Field of Classification Search
CPC ............... G06F 8/75; G06F 8/71; G06F 8/33
USPC ............................................. 717/120
See application file for complete search history.

(56) References Cited

U.S. PATENT DOCUMENTS

2022/0012020 A1* 1/2022 Barke .................. G06F 8/33

* cited by examiner

*Primary Examiner* — John Q Chavis
(74) *Attorney, Agent, or Firm* — WORKMAN NYDEGGER

(57) ABSTRACT

Methods, systems, and computer program products for deploying a static code analyzer based on program synthesis from input-output examples. A computer system uses program synthesis on a set of input-output examples of source code edits to generate a rewrite rule that defines a transformation pattern. Based on a determined static code analyzer format, the computer system generates a static code analyzer from the rewrite rule. The static code analyzer includes a find portion that indicates a matching condition for identifying a portion of source code text, and a fix portion that indicates a textual replacement to apply to the portion of source code text matched by the find portion. The computer system deploys the static code analyzer to a development environment, including configuring the static code analyzer to be executable against a source code file within the development environment.

20 Claims, 5 Drawing Sheets

600a

601 {
601a — Repository.ResolveDependency(dependency1, null, false, false, Lowest);
601b — DependencyResolverUtility.ResolveDependency(repository, dependency1, null, false, false, Lowest);
}

602 {
602a — Repository.ResolveDependency(dependency2, null, false, false, Lowest);
602b — DependencyResolverUtility.ResolveDependency(repository, dependency2, null, false, false, Lowest);
}

603 {
P_GUARD = Input matches X1.X2(X3, X4, X5, X6, X7) where
| X1, label = Identifier ^ X1, Attributes[TextValue] = repository
| X2, label = Identifier ^ X2, Attributes[TextValue] = ResolveDependency
| X3, label = X4 = ... = Argument ^ X4, Attributes [TextValue] = null ^ ...
P_TRANS = return DependencyResolverUtility.X2 (X1, X3, X4, X5, X6, X7)
}

*FIG. 6B*

DEPLOYING A STATIC CODE ANALYZER BASED ON PROGRAM SYNTHESIS FROM INPUT-OUTPUT EXAMPLES

BACKGROUND

Development of software applications involves the creation and maintenance of program source code files. As part of software development, developers often perform repetitive edits to source code files in order to add new features, to repair bugs, to refactor code (e.g., to use new frameworks, to use new coding styles or standards), and the like. Frequently, these repetitive edits are context-specific and can be applied to multiple locations in the source code files having similar contexts. As an example of code refactoring, the way in which exceptions are handled, and the way in which exception handlers are written, may evolve as programming languages and development processes evolve. Thus, an application's source code may need to be refactored in many places—and in similar ways—to update exception handling code.

Regardless of the reason that repetitive edits are needed, performing these repetitive edits manually is tedious and error prone. To reduce the developer's burden in performing repetitive edits, software tools—such as Integrated Development Environments (IDEs) and static analysis tools (e.g., .NET Compiler Platform Analyzers, such as Roslyn analyzers)—define transformation rules (static code analyzers) for some fixed class of repetitive edits that are frequently encountered. However, these static code analyzers are limited (e.g., generic), and extending them is complicated (generally requiring advanced domain-specific knowledge), manual, and time-consuming. This has greatly limited the adoption and usefulness of static code analyzers. As such, even with the availability of static code analyzers within IDEs and static analysis tools, most repetitive edits continue to be performed manually.

BRIEF SUMMARY

Programming-by-example synthesis (program synthesis) technologies automatically learn transformations based on examples of repetitive edits. Some program synthesis technology (e.g., PROSE from MICROSOFT CORPORATION) has been applied to source code editors, to automatically learn program transformations on-the-fly based on edits made during an editor session, and to use those learned program transformations to provide suggested edits during that editor session. However, these automatically learned program transformations are transient, only being available during the editor session during which they were learned.

At least some embodiments described utilize program synthesis technologies to generate static code analyzers from automatically learned transformations (rewrite rules), and deploy those static code analyzers within a development environment for use at any future time, at any number of computer systems, and for any number of users. Thus, the embodiments herein extend program synthesis technology beyond transient use during a given editor session, and overcome the shortcomings associated with static code analyzers— namely, that they limited (e.g., generic), and that extending them is complicated (generally requiring advanced domain-specific knowledge), manual, and time-consuming.

The embodiments described herein overcome the historic genericness of static code analyzers, by generating new static code analyzer(s) based on code edit examples within a code base that is being authored by the user(s) that will be utilizing the new static code analyzer(s). Thus, the embodiments described herein provide new static code analyzers that are specific and relevant to a specific code base. The embodiments described herein also overcome the complexity of static code analyzers, and the manual and time-consuming manner in which they have been created, by automatically generating static code analyzers based on user examples. This gives the user an immediately usable static code analyzer, without the need to have advanced domain-specific knowledge or engage in manual authoring. This also gives the user a start for editing and customizing the static code analyzer, if desired.

The embodiments described herein also overcome the transient manner in which program synthesis technology has been applied to source code editors, by persisting automatically learned rewrite rules as static code analyzers that can be deployed to development environments at a current computer system, or at other computer systems. Thus, the automatically learned rewrite rules can be utilized (via static code analyzers) in future development activities at the current computer system, or at other computer systems. These static code analyzers can work as guards against use of old coding patterns in new source code, and enable the automatic application of repetitive edits to current code bases.

In some aspects, the techniques described herein relate to a method, implemented at a computer system that includes a processor, for deploying a static code analyzer based on program synthesis from input-output examples, the method including: using program synthesis on a set of input-output examples of source code edits, automatically generating a set of rewrite rules that each defines one or more transformation patterns derived from the set of input-output examples; based on a determined static code analyzer format, generating one or more static code analyzers from the set of rewrite rules, each static code analyzer including: a find portion derived from a rewrite rule in the set of rewrite rules, the find portion indicating one or more matching conditions for identifying one or more portions of source code text; and a fix portion derived from the rewrite rule, the fix portion indicating one or more textual replacements to apply to the one or more portions of source code text matched by the find portion; and deploying the one or more static code analyzers to a development environment, the deploying including configuring the one or more static code analyzers to be executable against a source code file within the development environment.

In some aspects, the techniques described herein relate to a computer system, including: a processor; and a computer storage media that stores computer-executable instructions that are executable by the processor to cause the computer system to at least: use program synthesis on a set of input-output examples of source code edits, automatically generating a set of rewrite rules that each defines one or more transformation patterns derived from the set of input-output examples; based on a determined static code analyzer format, generate one or more static code analyzers from the set of rewrite rules, each static code analyzer including: a find portion derived from a rewrite rule in the set of rewrite rules, the find portion indicating one or more matching conditions for identifying one or more portions of source code text; and a fix portion derived from the rewrite rule, the fix portion indicating one or more textual replacements to apply to the one or more portions of source code text matched by the find portion; and deploy the one or more static code analyzers to a development environment, the deploying including configuring the one or more static code analyzers to be executable against a source code file within the development environment.

In some aspects, the techniques described herein relate to a computer program product including a computer storage media that stores computer-executable instructions that are executable by a processor to cause a computer system to deploy a static code analyzer based on program synthesis from input-output examples, the computer-executable instructions including instructions that are executable by the processor to cause the computer system to at least: use program synthesis on a set of input-output examples of source code edits, automatically generating a set of rewrite rules that each defines one or more transformation patterns derived from the set of input-output examples; based on a determined static code analyzer format, generate one or more static code analyzers from the set of rewrite rules, each static code analyzer including: a find portion derived from a rewrite rule in the set of rewrite rules, the find portion indicating one or more matching conditions for identifying one or more portions of source code text; and a fix portion derived from the rewrite rule, the fix portion indicating one or more textual replacements to apply to the one or more portions of source code text matched by the find portion; and deploy the one or more static code analyzers to a development environment, the deploying including configuring the one or more static code analyzers to be executable against a source code file within the development environment.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 6A shows an example of input-output examples; and

FIG. 6B shows an example of a rewrite rule.

DETAILED DESCRIPTION

At least some embodiments described herein utilize programming-by-example synthesis (program synthesis) technologies. As used herein, "program synthesis" is a technique that learns a program that meets a developer's intent as expressed in some input-output example specification. A goal of program synthesis to generate a program that is consistent with the provided example(s), and that produces outputs on all additional positive inputs and not on any additional negative inputs. Thus, a program transformation (rewrite rule) generated by program synthesis represents the edits made to an example input, to produce an output that is semantically equivalent to input. Examples of program synthesis technologies are described in U.S. patent Ser. No. 17/038,427 filed Sep. 30, 2020, and titled "FEEDBACK-DRIVEN SEMI-SUPERVISED SYNTHESIS OF PROGRAM TRANSFORMATIONS," the entire contents of which are incorporated by reference herein in their entirety.

At least some embodiments described herein generate a static code analyzer. As used herein, a "static code analyzer" is comprised of declarative or programmatic statements that define one or more "finder" and "fixer" pairs. A finder comprises matching condition(s) configured to identify or select or more portions of a source code file against which the static code analyzer is being run, while each fixer comprises replacement(s) configured used to replace/transform text within those identified/selected portion(s).

Figure 1:
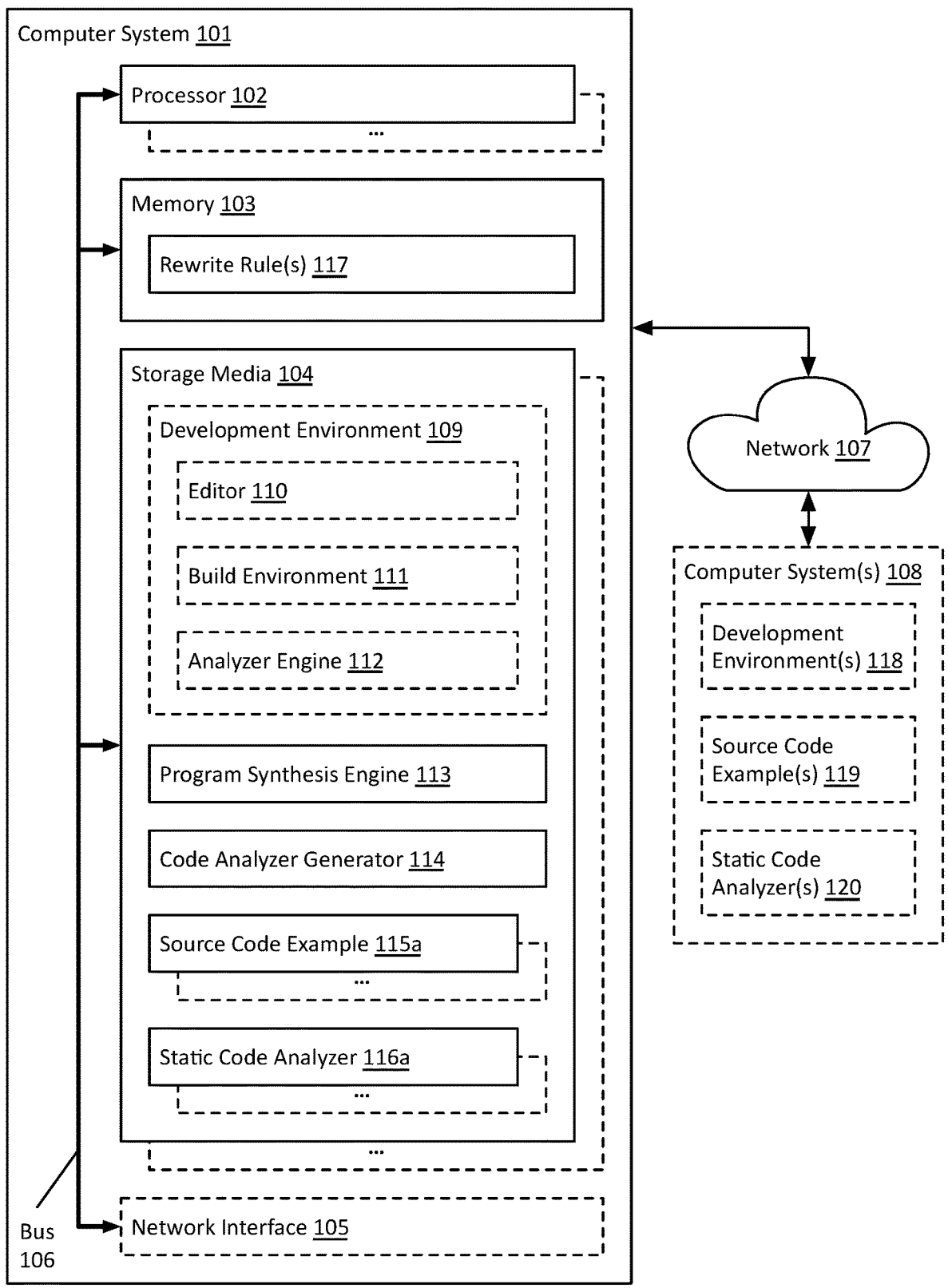
FIG. 1 illustrates an example computer architecture that facilitates deploying a static code analyzer based on program synthesis from input-output examples.

At least some embodiments described herein generate static code analyzers from transformations (rewrite rules) learned through program synthesis technologies, and deploy those static code analyzers within one or more development environments for use at any future time, at any number of computer systems, and for any number of users. FIG. 1 illustrates an example computer architecture 100 that facilitates deploying a static code analyzer based on program synthesis from input-output examples. As shown, computer architecture 100 includes a computer system 101 comprising a processor 102 (or a plurality of processors), a memory 103, and one or more computer storage media (storage media 104), all interconnected by a bus 106. As shown, computer system 101 may also include a network interface 105 for interconnecting (via a network 107) to one or more other computer system(s) 108.

The storage media 104 is illustrated as storing computer-executable instructions implementing at least a program synthesis engine 113 and a code analyzer generator 114. Although the program synthesis engine 113 is shown as being separate from the code analyzer generator 114, in some embodiments the program synthesis engine 113 is a sub-component of the code analyzer generator 114.

In general, the code analyzer generator 114 utilizes utilize program synthesis technologies (i.e., program synthesis engine 113) on one or more input-output examples to learn one or more code transformations (rewrite rules) from those examples, generates one or more static code analyzers from the learned code transformation(s), and deploys the generated static code analyzer(s) to one or more development environments. In computer architecture 100, the input-output example(s) are illustrated as source code example(s) 115 (including source code example 115a) within storage media 104 and/or source code example(s) 119 at computer system(s) 108; the learned code transformation(s) are illustrated as rewrite rule(s) 117 within memory 103; the generated static code analyzer(s) are illustrated as static code analyzer(s) 116 (including static code analyzer 116a) within storage media 104 and/or static code analyzer(s) 120 at computer system(s) 108; and the development environment(s) are illustrated as development environment 109 within storage media 104 and/or development environment(s) 118 at computer system (s) 108.

Figure 4:
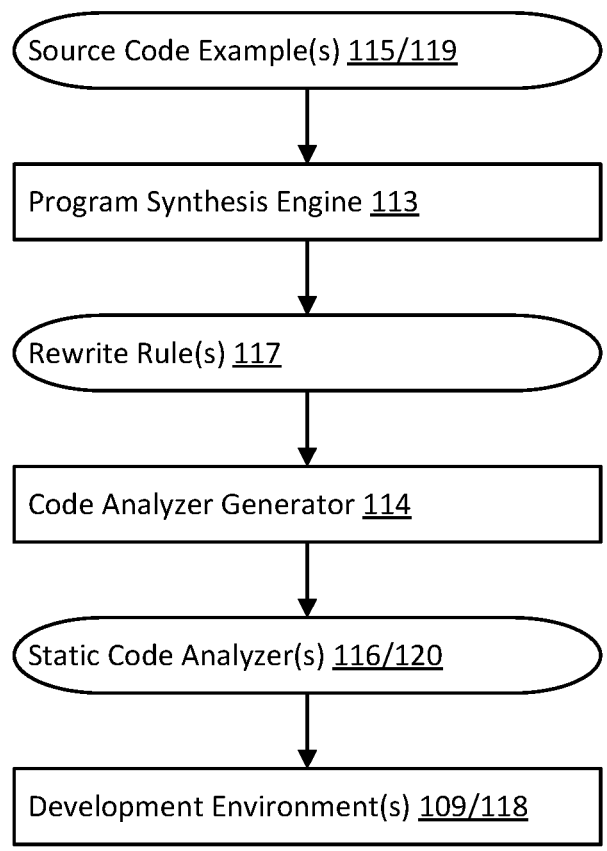
FIG. 4 illustrates a process flow for generating and deploying a static code analyzer.

FIG. 4 illustrates an example 400 of a general process flow for generating and deploying a static code analyzer, using the data and components of computer architecture 100. As shown in example 400, the code analyzer generator 114 identifies and provides one or more source code examples (i.e., source code example(s) 115, 119) as input-output examples to the program synthesis engine 113. The program synthesis engine 113, in turn, generates rewrite rule(s) 117 from those source code example(s). After generation of the rewrite rule(s) 117, the code analyzer generator 114 generates one or more static code analyzers (i.e., static code analyzer(s) 116, 120) from the rewrite rule(s) 117, and deploys those static code analyzer(s) to one or more development environments (e.g., development environment 109, development environment(s) 118).

As exemplified by development environment 109, in some embodiments development environments generally include (or are associated with) one or more of an editor 110, a build environment 111, or an analyzer engine 112. In embodiments, the editor 110 is a source code editor configured for creating and modifying one or more source code files as part of one or more application development projects. In embodiments, the build environment 111 is a compiler toolchain (e.g., parser, compiler, linker, etc.) used to build an application development project into a distributable form, such as an application binary. In embodiments, the analyzer engine 112 executes one or more static code analyzers against files being operated on within the development environment 109 (e.g., by editor 110, by build environment 111). In embodiments, by deploying one or more static code analyzers (i.e., static code analyzer(s) 116, 120) to one or more development environments (e.g., development environment 109, development environment(s) 118), the code analyzer generator 114 makes those static code analyzer(s) available for use at those development environments, such as to operate against source code file(s) being edited within the editor 110, or to operate against the source code file(s) being built by the build environment 111.

In some embodiments, a development environment (e.g., one of development environment(s) 118) is a hosted development environment, and may be part of a code distribution environment, such as GITHUB. Thus, in embodiments, when the code analyzer generator 114 makes static code analyzer(s) available for use at a development environment, the code analyzer generator 114 makes the static code analyzer(s) available at a hosted development environment, such as GITHUB.

Figure 2:
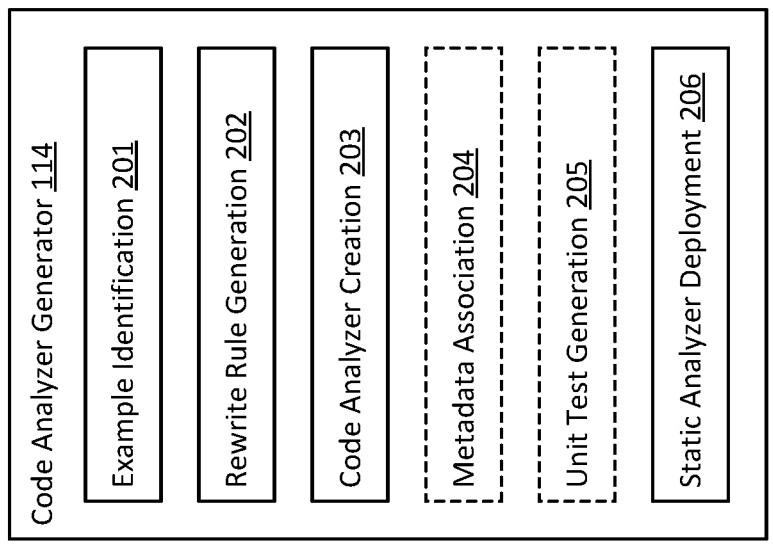
FIG. 2 illustrates an example of a code analyzer generator.

FIG. 2 illustrates an example 200 of the code analyzer generator 114 of FIG. 1. As shown, in embodiments the code analyzer generator 114 includes an example identification component 201, a rewrite rule generation component 202, a code analyzer creation component 203, a metadata association component 204, a unit test generation component 205, and static analyzer deployment component 206. Each component of the code analyzer generator 114 depicted in FIG. 2 represents various functionalities that code analyzer generator 114 might implement in accordance with various embodiments described herein. It will be appreciated, however, that the depicted components—including their identity and arrangement—are presented merely as an aid in describing various embodiments of the code analyzer generator 114.

In embodiments, the example identification component 201 identifies one or more input-output examples (i.e., source code example(s) 115, 119), each demonstrating at least one source code edit. For instance, an input-output example includes an input comprising an initial code statement state (i.e., a source code statement prior to a user edit), and an output comprising a revised code statement state (i.e., the source code statement after the user edit). The example identification component 201 can identify input-output examples from a variety of locations, such as from a set of code review requests (e.g., a set of GITHUB Pull Requests), from code edits performed during an editing session within a code editor (e.g., editor 110), from an analysis of two or more versions of a code repository, and the like. Referring to FIG. 1, the example identification component 201 can identify input-output examples from one, or more, of computer system 101 (e.g., source code example(s) 115) or computer system(s) 108 (e.g., source code example(s) 119).

In embodiments, the rewrite rule generation component 202 generates one or more rewrite rules (i.e., rewrite rule(s) 117) based on the input-output example(s) identified by the example identification component 201. In embodiments, the rewrite rule generation component 202 comprises, or utilizes, the program synthesis engine 113. In one example, the program synthesis engine 113 uses programming-by-example synthesis technologies to a generate program that is consistent with the provided example(s), and that produces outputs on all additional positive inputs and not on any additional negative inputs. Thus, a program transformation (rewrite rule) generated by program synthesis represents the edits made to an example input, to produce an output that is semantically equivalent to input. An example of the program synthesis engine 113 is the PROSE program synthesis engine from MICROSOFT CORPORATION.

In embodiments, the code analyzer creation component 203 identifies a target static analyzer format, and then converts the rewrite rule(s) 117 generated by the rewrite rule generation component 202 into one or more static code analyzers (i.e., static code analyzer(s) 116 and/or static code analyzer(s) 120). The particular static analyzer format can vary depending on implementation, but in embodiments the target static analyzer format is .NET Compiler Platform (Roslyn) analyzer configured to inspect and fix code for style, quality, maintainability, design, and the like. In embodiments, a static code analyzer includes one or more finder and fixer pairs (e.g., embodied in rules, statements, functions). In various embodiments, a finder/fixer pair comprises one or more of a regular expression, an executable code block, a declarative statement, and the like. In embodiments, the target static analyzer format comprises human-readable (and human editable) expressions, statements, source code, and the like.

Figure 3:
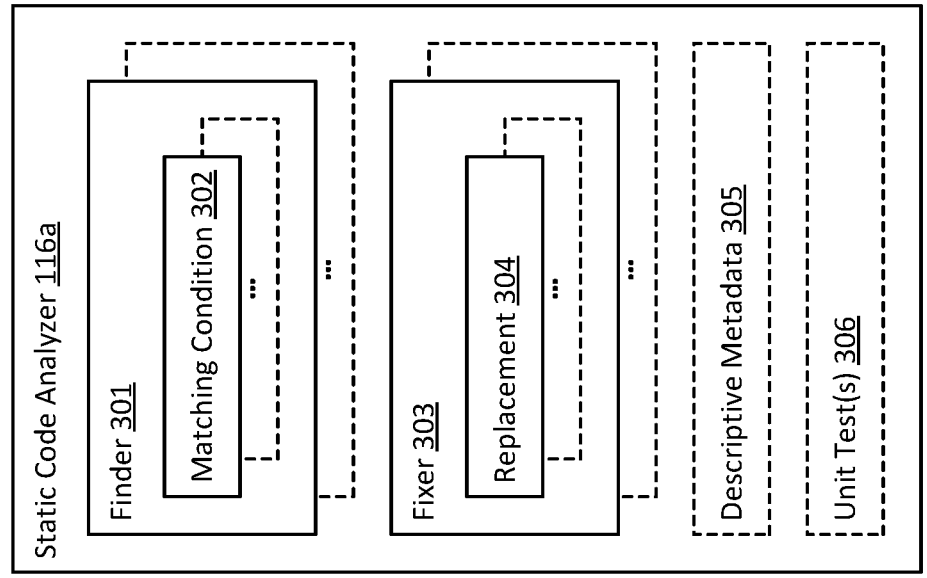
FIG. 3 illustrates an example of a static code analyzer.

FIG. 3 illustrates an example 300 of a static code analyzer, such as static code analyzer 116a. Thus, as shown, static code analyzer 116a conceptually includes a finder 301 (or a plurality of finders), and for each finder the static code analyzer 116a conceptually includes a fixer 303. As shown, each finder 301 comprises a matching condition 302 (or a plurality of matching conditions), and each fixer 303 comprises a replacement 304 (or a plurality of replacements). In embodiments, matching conditions are used to select/locate (e.g., match to) or more portions of a source code file against which the static code analyzer 116a is being run, and replacements are used to replace/transform text within those selected/located portion(s).

In some embodiments, the metadata association component 204 associates descriptive metadata with a static code analyzer generated by the code analyzer creation component 203. Thus, in example 300, static code analyzer 116a is shown as potentially including descriptive metadata 305. In embodiments, descriptive metadata 305 includes any form of metadata that identifies the static code analyzer, and/or describes/explains the function of the static code analyzer. In embodiments, the descriptive metadata 305 includes one or more of a creation date and/or time, a static code analyzer name, a static code analyzer description, and the like. In some embodiments, at least a portion of descriptive metadata 305 is received as a user input.

In some embodiments, the unit test generation component 205 generates one or more unit tests for a static code analyzer generated by the code analyzer creation component 203. Thus, in example 300, static code analyzer 116a is shown as potentially including (or at least being associated with) unit test(s) 306. In embodiments, each unit test ensures that the finder(s) and fixer(s) of the corresponding static code analyzer operate properly against defined input(s) to produce defined output(s) (e.g., given an input defined by a given input-output example from which the static code analyzer was derived, the static code analyzer produces the output defined by that input-output example). As discussed in connection with the code analyzer creation component 203, in embodiments a target static analyzer format comprises human-readable (and human editable) expressions, statements, source code, and the like. This gives a user a start for editing and customizing the static code analyzer, if desired. In embodiments, by generating unit test(s) 306, the unit test generation component 205 provides a mechanism to ensure that the static code analyzer operates properly (e.g., in a manner consistent with the input-output example(s) from which the static code analyzer was derived), even after there have been user-made edits to the finder(s) and fixer(s) of the static code analyzer.

In embodiments, the static analyzer deployment component 206 deploys one or more generated static code analyzers to one or more development environments (e.g., development environment 109, development environment(s) 118) for use at those development environments. For example, in embodiments the static analyzer deployment component 206 adds static code analyzer(s) to one or more libraries of static code analyzers, and which are consumable by the analyzer engine 112 at those development environment(s) for analysis of source code files being operated on at those development environment(s)— such as source code files that are being edited in an editor, or being processed by a build environment.

In one example, based on the generation and deployment of static code analyzer 116a to development environment 109 by the code analyzer generator 114, that static code analyzer 116a becomes available for providing code editing suggestions within the editor 110 (e.g., based on the analyzer engine 112 applying the static code analyzer 116a to a source code file being edited within the editor 110). Thus, in embodiments, the static code analyzer 116a is utilized within the editor 110 to find and fix programmatic and stylistic errors within code blocks of that source code file (e.g., to automatically make replacements, to visually highlight suggested replacements, etc.), to provide autocomplete suggestions as a user types, and/or to be used as a guard to prevent a user from using out-of-date code styles and syntax.

In another example, based on the generation and deployment of static code analyzer 116a to development environment 109 by the code analyzer generator 114, that static code analyzer 116a becomes available for automatically validating source code files as those source code files are being processed by the build environment 111 (e.g., based on the analyzer engine 112 applying the static code analyzer 116a to a source code file being processed by the build environment 111). Thus, in embodiments, the static code analyzer 116a is utilized within the build environment 111 to automatically check source code for programmatic and stylistic errors (at least according to the static code analyzer 116a), and to automatically fix those errors as part of a build process. Thus, in embodiments, the static code analyzer 116a becomes available to not only serve to "lint" source code for programmatic and/or stylistic errors during a build process (i.e., using the finders(s) in the static code analyzer 116a), but to also fix those errors as well (i.e., using the fixer(s) in the static code analyzer 116a).

The components of the code analyzer generator 114 are now described in connection with FIG. 5, which illustrates a flow chart of an example method 500 for deploying a static code analyzer based on program synthesis from input-output examples, in light of the data and components of computer architecture 100. In embodiments, instructions for implementing method 500 are encoded as computer-executable instructions (e.g., code analyzer generator 114) stored on a computer storage media (e.g., storage media 104) that are executable by a processor (e.g., processor 102) to cause a computer system (e.g., computer system 101) to perform method 500.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Figure 5:
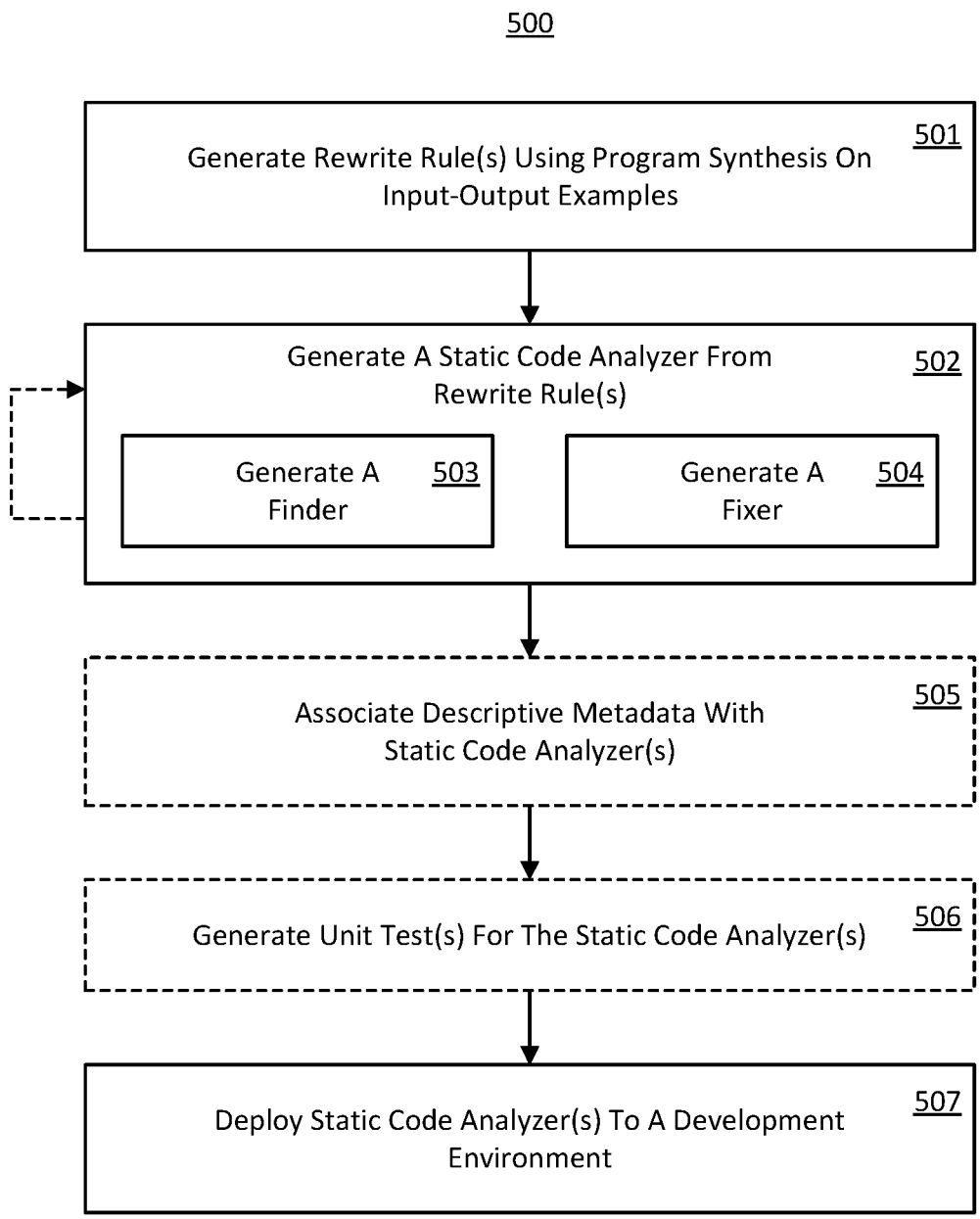
FIG. 5 illustrates a flow chart of an example method for deploying a static code analyzer based on program synthesis from input-output examples.

Referring to FIG. 5, in embodiments, method 500 comprises an act 501 of generating rewrite rule(s) using program synthesis on input-output examples. In some embodiments, act 501 comprises using program synthesis on a set of input-output examples of source code edits, automatically generating a set of rewrite rules that each defines one or more transformation patterns derived from the set of input-output examples. In an example, based on the identification component 201 having identified source code example(s) 115 (including source code example 115a), the rewrite rule generation component 202 generates rewrite rule(s) 117 using program synthesis techniques (program synthesis engine 113). In embodiments, effects of act 501 include the learning of code transformations based on input examples of those transformations.

In embodiments, each input-output example includes an initial code statement state and a revised code statement state. For instance, FIG. 6A shows an example 600a of input-output examples, including an input-output example 601 in which an initial code statement 601a is transformed to a revised code statement 601b, and an input-output example 602 in which an initial code statement 602a is transformed to a revised code statement 602b. In these examples, the ResolveDependency method has been refactored to make it static and then moved it to a new static class, DependencyResolveUtility. The examples differ in the first method argument (i.e., dependency1 and dependency2, respectively). FIG. 6B shows an example 600b of a rewrite rule 603 that might be generated by the rewrite rule generation component 202 based on the input-output examples shown in FIG. 6A. As shown, rewrite rule 603 he $P_{GUARD}$ includes a location expression that is used to match uses in the form of "repository.ResolveDependency( . . . )", and $P_{TRANS}$ represents the operation that is applied to the matching locations to transform it to the form of "DependencyResolverUtility.ResolveDependency(repository, . . . )".

Notably, the set of input-output examples can be obtained from a variety of sources. In one example, method 500 is initiated based a developer approving one or more code review requests for an application project. Thus, in embodiments of act 501, the set of input-output examples are obtained from one or more code review requests. In embodiments, obtaining input-output examples from code review requests enables the generation of static code analyzers that are specific and pertinent to the project for which the code review requests were submitted, such as by generating static code analyzers based on code refactoring that has recently been applied to that project. This means that these static code analyzers will be useful for making future edits to the project, and can even serve as a guard against using out-of-date coding techniques when authoring new code for the project.

In another example, method 500 is initiated based a developer having made one or more edits to one or more source code files within a source code editor (e.g., editor 110). Thus, in embodiments of act 501, the set of input-output examples are obtained from an editing session within a code editor. In embodiments, obtaining input-output examples from editing session within a code editor enables the generation of static code analyzers that are specific to source code that is being actively worked on. This means that these static code analyzers will be immediately useful during code editing sessions for finding and fixing programmatic and stylistic errors within source code files, to provide autocomplete suggestions as a user types, and/or to be used as a guard to prevent a user from using out-of-date code styles and syntax.

Method 500 also comprises an act 502 of generating a static code analyzer from rewrite rule(s). In some embodiments, act 502 comprises, based on a determined static code analyzer format, generating one or more static code analyzers from the set of rewrite rules. In an example, based on at least one rewrite rule in rewrite rule(s) 117, the code analyzer creation component 203 generates static code analyzer 116a. For instance, the code analyzer creation component 203 converts the rewrite rule 603 shown in FIG. 6B into a Roslyn static analyzer format. In embodiments, effects of act 502 include the generation of a static code analyzer that persists a transformation that was learned by the program synthesis engine 113. Additionally, in embodiments, effects of act 502 include overcoming the historic complexity of static code analyzers, and the manual and time-consuming manner in which they have been created, by automatically generating static code analyzers based on user examples. A broken arrow shows that act 502 can repeat to generate any number of static code analyzers.

As discussed in connection with FIG. 3, each static code analyzer includes a finder 301. Thus, as shown, act 502 comprises an act 503 of generating a finder. In some embodiments, act 503 comprises generating a find portion derived from a rewrite rule in the set of rewrite rules, the find portion indicating one or more matching conditions for identifying one or more portions of source code text. In an example, the code analyzer creation component 203 creates finder 301, which includes matching condition 302; for instance, based on rewrite rule 603 the code analyzer creation component 203 creates a finder that matches uses of repository.ResolveDependency( . . . ).

As discussed in connection with FIG. 3, each static code analyzer includes a fixer 303. Thus, act 502 also comprises an act 504 of generating a fixer. In some embodiments, act 504 comprises generating a fix portion derived from the rewrite rule, the fix portion indicating one or more textual replacements to apply to the one or more portions of source code text matched by the find portion. In an example, the code analyzer creation component 203 also creates fixer 303, which includes a replacement 304 (or a plurality of replacements). For instance, based on rewrite rule 603 the code analyzer creation component 203 creates a fixer that converts matched uses of repository.ResolveDependency( . . . ) to the form "DependencyResolverUtility.ResolveDependency(repository, . . . )".

In some embodiments, each static code analyzer is comprised of human-readable (and human editable) statements and/or source code. Thus, in embodiments of act 502, generating the one or more static code analyzers comprises generating a static code analyzer comprising a find portion and a fix portion that are authored in human-editable text. In embodiments, effects of generating a static code analyzers comprising human-editable text gives a developer a head-start in editing and customizing the static code analyzer.

In some embodiments, method 500 also comprises an act 505 of associating descriptive metadata with static code analyzer(s). In some embodiments, act 505 comprises associating metadata with a static code analyzer, the metadata comprising at least one of a name of the static code analyzer or a description of the static code analyzer. In an example, based on a user input, the metadata association component 204 associates descriptive information with static code analyzer 116a as descriptive metadata 305. In embodiments, association of descriptive metadata with a static code analyzer increases the usefulness of the static code analyzer, since the descriptive metadata can be used to determine whether the static code analyzer will be applicable in a given scenario.

In one example, based on method 500 having been initiated based a developer approving one or more code review requests for an application project, that developer provides user input to give descriptive information for static code analyzer 116a, such as to give static code analyzer 116a a name and/or to explain its function (e.g., to carry out a particular form of code refactoring). In another example, based on method 500 having been initiated based a developer having made one or more edits to one or more source code files within a source code editor, that developer provides user input to give descriptive information for static code analyzer 116a, such as to give static code analyzer 116a a name and/or to explain its function (e.g., to carry out a particular form of code refactoring). In either case, the metadata association component 204 associates this descriptive information with static code analyzer 116a as descriptive metadata 305.

In some embodiments, method 500 also comprises an act 506 of generating unit test(s) for the static code analyzer(s). In some embodiments, act 506 comprises generating a unit test for a static code analyzer, the unit test comprising at least one input-output example upon which the static code analyzer is based. In an example, the generates unit test(s) 306 for static code analyzer 116a, which ensure that the finder(s) and fixer(s) of static code analyzer 116a operate properly against defined input(s) to produce defined output(s). In embodiments, generation of unit tests provides a mechanism to ensure that a static code analyzer operates properly (e.g., in a manner consistent with the input-output example(s) from which the static code analyzer was derived), even after there have been user-made edits to the finder(s) and fixer(s) of the static code analyzer.

Method 500 also comprises an act 507 of deploying static code analyzer(s) to a development environment. In some embodiments, act 507 comprises deploying the one or more static code analyzers to a development environment, the deploying including configuring the one or more static code analyzers to be executable against a source code file within the development environment. In an example, the static analyzer deployment component 206 deploys static code analyzer 116a to development environment 109 for use at computer system 101, and/or deploys static code analyzer 116a to development environment(s) 118 for use at computer system(s) 108. For example, the static analyzer deployment component 206 adds static code analyzer 116a to one or more libraries of static code analyzers that are available at development environment 109 and/or development environment(s) 118, and which are consumable by the analyzer engine 112 at those development environment(s) for analysis of source code files being operated on at those development environment(s). In embodiments, effects of act 506 include making a static code analyzer available use at any future time, at any number of computer systems, and for any number of users.

In some embodiments of act 507, deploying the one or more static code analyzers to the development environment comprises deploying the one or more static code analyzers to a source code editor (e.g., editor 110). These embodiments, configuring the one or more static code analyzers to be executable against a source code file within the development environment comprises configuring the one or more static code analyzers to operate against the source code file when it is being edited within the source code editor. For example, the static code analyzer 116a is utilized within the editor 110 to find and fix programmatic and stylistic errors within code blocks of that source code file (e.g., to automatically make replacements, to visually highlight suggested replacements, etc.), to provide autocomplete suggestions as a user types, and/or to be used as a guard to prevent a user from using out-of-date code styles and syntax.

In some embodiments of act 507, deploying the one or more static code analyzers to the development environment comprises deploying the one or more static code analyzers to a source code build environment (e.g., build environment 111). These embodiments, configuring the one or more static code analyzers to be executable against a source code file within the development environment comprises configuring the one or more static code analyzers to operate against the source code file when it is being built by the source code build environment. For example, the static code analyzer 116a is utilized within the build environment 111 to automatically check source code for programmatic and stylistic errors (at least according to the static code analyzer 116a), and to automatically fix those errors as part of a build process.

Accordingly, the embodiments described utilize program synthesis technologies to generate static code analyzers from automatically learned transformations (rewrite rules), and deploy those static code analyzers within a development environment for use at any future time, and for any number of users. Thus, the embodiments herein extend program synthesis technology beyond transient use during a given editor session, and overcome the shortcomings associated with static code analyzers—namely, that they limited (e.g., generic), and that extending them is complicated (generally requiring advanced domain-specific knowledge), manual, and time-consuming.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system (e.g., computer system 101) that includes computer hardware, such as, for example, one or more processors (e.g., processor 102) and system memory (e.g., memory 103), as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 104). Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 105), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a computer system that includes a processor, for deploying a static code analyzer based on program synthesis from input-output examples, the method comprising:
    using program synthesis on a set of input-output examples of source code edits, automatically generating a set of rewrite rules that each defines one or more transformation patterns derived from the set of input-output examples;
    based on a determined static code analyzer format, generating one or more static code analyzers from the set of rewrite rules, each static code analyzer including:
        a find portion derived from a rewrite rule in the set of rewrite rules, the find portion indicating one or more matching conditions for identifying one or more portions of source code text; and
        a fix portion derived from the rewrite rule, the fix portion indicating one or more textual replacements to apply to the one or more portions of source code text matched by the find portion; and
    deploying the one or more static code analyzers to a development environment, the deploying including configuring the one or more static code analyzers to be executable against a source code file within the development environment.

2. The method of claim 1, wherein each input-output example includes an initial code statement state and a revised code statement state.

3. The method of claim 1, wherein the set of input-output examples are obtained from one or more code review requests.

4. The method of claim 1, wherein the set of input-output examples are obtained from an editing session within a code editor.

5. The method of claim 1, wherein generating the one or more static code analyzers also includes associating metadata with a static code analyzer, the metadata comprising at least one of a name of the static code analyzer or a description of the static code analyzer.

6. The method of claim 1, wherein generating the one or more static code analyzers also includes generating a unit test for a static code analyzer, the unit test comprising at least one input-output example upon which the static code analyzer is based.

7. The method of claim 1, wherein generating the one or more static code analyzers comprises generating a static code analyzer comprising a find portion and a fix portion that are authored in human-editable text.

8. The method of claim 1, wherein deploying the one or more static code analyzers to the development environment comprises deploying the one or more static code analyzers to a source code editor, and wherein configuring the one or more static code analyzers to be executable against a source code file within the development environment comprises configuring the one or more static code analyzers to operate against the source code file when it is being edited within the source code editor.

9. The method of claim 1, wherein deploying the one or more static code analyzers to the development environment comprises deploying the one or more static code analyzers to a source code build environment, wherein configuring the one or more static code analyzers to be executable against a source code file within the development environment comprises configuring the one or more static code analyzers to operate against the source code file when it is being built by the source code build environment.

10. A computer system, comprising:
a processor; and
a computer storage media that stores computer-executable instructions that are executable by the processor to cause the computer system to at least:
use program synthesis on a set of input-output examples of source code edits, automatically generating a set of rewrite rules that each defines one or more transformation patterns derived from the set of input-output examples;
based on a determined static code analyzer format, generate one or more static code analyzers from the set of rewrite rules, each static code analyzer including:
a find portion derived from a rewrite rule in the set of rewrite rules, the find portion indicating one or more matching conditions for identifying one or more portions of source code text; and
a fix portion derived from the rewrite rule, the fix portion indicating one or more textual replacements to apply to the one or more portions of source code text matched by the find portion; and
deploy the one or more static code analyzers to a development environment, the deploying including configuring the one or more static code analyzers to be executable against a source code file within the development environment.

11. The computer system of claim 10, wherein each input-output example includes an initial code statement state and a revised code statement state.

12. The computer system of claim 10, wherein the set of input-output examples are obtained from one or more code review requests.

13. The computer system of claim 10, wherein the set of input-output examples are obtained from an editing session within a code editor.

14. The computer system of claim 10, wherein generating the one or more static code analyzers also includes associating metadata with a static code analyzer, the metadata comprising at least one of a name of the static code analyzer or a description of the static code analyzer.

15. The computer system of claim 10, wherein generating the one or more static code analyzers also includes generating a unit test for a static code analyzer, the unit test comprising at least one input-output example upon which the static code analyzer is based.

16. The computer system of claim 10, wherein generating the one or more static code analyzers comprises generating a static code analyzer comprising a find portion and a fix portion that are authored in human-editable text.

17. The computer system of claim 10, wherein deploying the one or more static code analyzers to the development environment comprises deploying the one or more static code analyzers to a source code editor, and wherein configuring the one or more static code analyzers to be executable against a source code file within the development environment comprises configuring the one or more static code analyzers to operate against the source code file when it is being edited within the source code editor.

18. The computer system of claim 10, wherein deploying the one or more static code analyzers to the development environment comprises deploying the one or more static code analyzers to a source code build environment, wherein configuring the one or more static code analyzers to be executable against a source code file within the development environment comprises configuring the one or more static code analyzers to operate against the source code file when it is being built by the source code build environment.

19. A computer program product comprising a computer storage media that stores computer-executable instructions that are executable by a processor to cause a computer system to deploy a static code analyzer based on program synthesis from input-output examples, the computer-executable instructions including instructions that are executable by the processor to cause the computer system to at least:
use program synthesis on a set of input-output examples of source code edits, automatically generating a set of rewrite rules that each defines one or more transformation patterns derived from the set of input-output examples;
based on a determined static code analyzer format, generate one or more static code analyzers from the set of rewrite rules, each static code analyzer including:
a find portion derived from a rewrite rule in the set of rewrite rules, the find portion indicating one or more matching conditions for identifying one or more portions of source code text; and
a fix portion derived from the rewrite rule, the fix portion indicating one or more textual replacements to apply to the one or more portions of source code text matched by the find portion; and
deploy the one or more static code analyzers to a development environment, the deploying including configuring the one or more static code analyzers to be executable against a source code file within the development environment.

20. The computer program product of claim 19, wherein generating the one or more static code analyzers also includes associating metadata with a static code analyzer, the metadata comprising at least one of a name of the static code analyzer or a description of the static code analyzer.

* * * * *